United States Patent [19]

Bergstrom

[11] Patent Number: 5,222,749
[45] Date of Patent: Jun. 29, 1993

[54] WEAR PROTECTORS FOR SNOWMOBILE SKIS

[76] Inventor: Scott T. Bergstrom, c/o Bergstrom Skeggs, Inc., 1158 Power Rd., Rockford, Ill. 61111

[21] Appl. No.: 848,324
[22] Filed: Mar. 9, 1992
[51] Int. Cl.⁵ .............................................. A63C 5/04
[52] U.S. Cl. .................................... 280/28; 280/21.1
[58] Field of Search ........................ 280/28, 21.1, 22

[56] References Cited

U.S. PATENT DOCUMENTS

| | | | |
|---|---|---|---|
| 3,718,341 | 2/1973 | Westberg | 280/28 |
| 3,942,812 | 3/1976 | Kozlow | 280/28 |
| 4,595,211 | 6/1986 | Fitzpatrick | 280/28 |
| 5,040,818 | 8/1991 | Metheny | 280/28 |

FOREIGN PATENT DOCUMENTS

| | | | |
|---|---|---|---|
| 828641 | 12/1969 | Canada | 280/28 |
| 50443 | 12/1909 | Switzerland | 280/28 |

OTHER PUBLICATIONS

Hi-Performance Engineering, Inc. Catalog, pp. 15–16 (1991).
Artic Cat Accessories Catalog (excerpts) (1992).
Parts Unlimited Snowmobile Catalog, p. 122 (Oct. 10, 1991).

Primary Examiner—Eric D. Culbreth
Attorney, Agent, or Firm—Leydig, Voit & Mayer

[57] ABSTRACT

Wear protectors for snowmobile skis are provided which comprise a relatively narrow strip composed of a wear resistant material, and wherein the strip is provided with one or more holes which are aligned with and accommodate the passage of bolts extending from a wear rod, whereby the strip may be secured to the bottom of a snowmobile ski by the wear rod.

3 Claims, 2 Drawing Sheets

WEAR PROTECTORS FOR SNOWMOBILE SKIS

BACKGROUND OF THE INVENTION

This invention relates generally to snowmobiles, but more particularly, to wear protectors to protect the bottom of snowmobile skis from wear and damage.

BACKGROUND OF THE INVENTION

Snowmobiles typically have a pair of skis. The skis, though they are made of steel or other relatively durable materials, can be damaged and tend to wear after a period of use. Thus, as a first line of defense, snowmobile skis typically are equipped with wear rods.

Wear rods are simply steel rods which extend along the bottom of the ski, near its center. They allow the snowmobile to cross highways, or to otherwise be operated for short periods of time in areas which are not covered with snow. Under such conditions, the wear rods support the weight of the snowmobile and prevent the bottom surface of the ski from contacting the ground. Thus, wear rods provide a significant degree of protection for skis.

Unfortunately, however, snowmobile skis are subject to damage and abrasion even when the snowmobile is operated in snow. On snowy terrain, the wear rods are embedded in the snow, and the weight of the snowmobile is supported largely by the skis. Thus, gravel and other abrasive debris in the snow can scrape along the bottom of the skis.

Various products have been devised to supplement the protection afforded by wear rods. Those products in general provide a plastic skin which completely covers the bottom of the ski and closely fits over its contours. The contours on the bottom of snowmobile skis, which usually provide a keel for the ski, are substantial. On the other hand, plastics which are sufficiently durable to provide extended wear protection, at least in the thicknesses commonly employed, are relatively rigid. Consequently, relatively expensive techniques are required to manufacture plastic skins with conforming contours.

One approach has been to fabricate skins from a thermoplastic polymer which can be injection molded. Injection molding, however, requires fabrication of relatively expensive molds. This approach has the additional drawback that plastics which can be injection molded are not as durable as other types of plastics.

More durable plastics have been used to fabricate ski skins, such as high density polyethylene, but plastics of this type must be shaped by compression molding. Compression molding is even more costly than injection molding.

Additionally, many of the prior art ski skins cannot be easily and quickly attached to a ski. They may require, for example, numerous rivets to secure them to the ski.

An object of this invention, therefore, is to provide a wear protector which will protect a snowmobile ski from damage and wear, but which can be manufactured more quickly, easily, and economically, and without molding techniques.

A further object is to provide a wear protector which is more quickly and easily attached and detached from a snowmobile ski.

Another object is to provide a more durable wear protector.

It is also an object of the subject invention to provide a wear protector wherein all of the above advantages are realized.

Those and other objects and advantages of the invention will be apparent to those skilled in the art upon reading the following detailed description and upon reference to the drawings.

SUMMARY OF THE INVENTION

The subject invention in general is predicated on applicant's appreciation that most of the wear occurs in close proximity to the wear rod, on the bottom surface of the keel, and that a relatively narrow wear strip can be fabricated from a wear resistant material without using molding processes. Accordingly, the subject invention provides for an article for protecting snowmobile skis from wear, which wear protector comprises a relatively narrow strip composed of a wear resistant material, and wherein the strip is provided with one or more holes which are aligned with and accommodate the passage of bolts extending from a wear rod, whereby the strip may be secured to the bottom of a snowmobile ski by the wear rod.

The subject invention also provides for a wear protector wherein the relatively narrow strip is composed of a high density polymer and has a groove in the bottom of the strip which is adapted to partially accommodate wear rods.

DETAILED DESCRIPTION OF THE INVENTION

Figure 1:
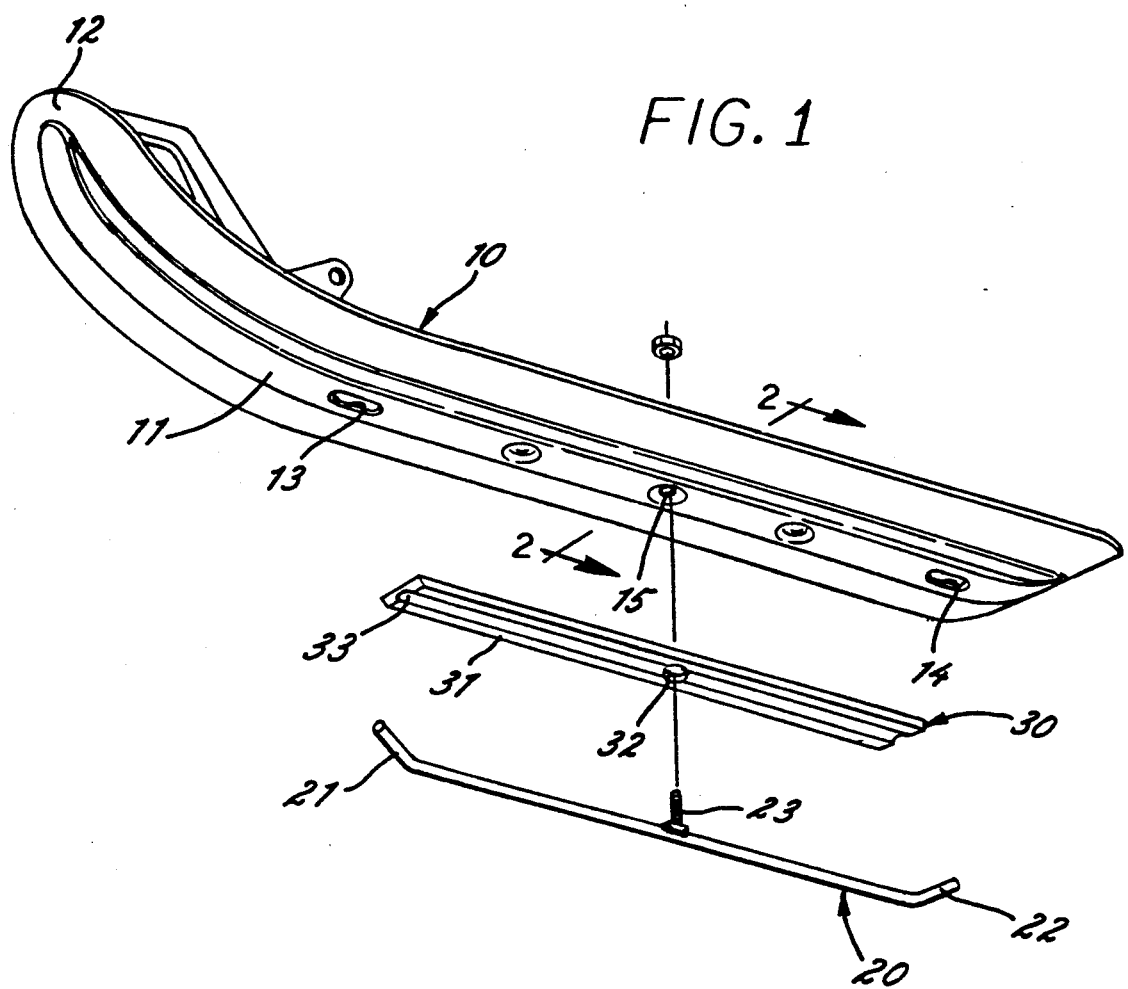
FIG. 1 is an exploded perspective view of a snowmobile ski assembly comprising a ski which is equipped with a wear rod and a preferred embodiment of the wear protectors of the subject invention.
Figure 2:
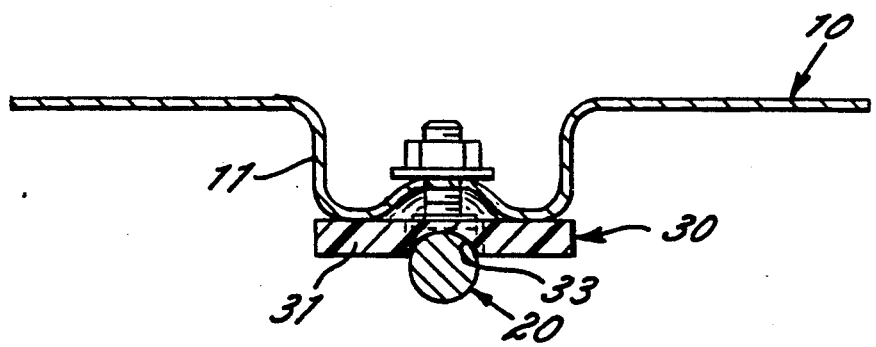
FIG. 2 is a lateral cross section, taken generally along line 2—2, of the ski assembly shown in FIG. 1.
Figure 3:
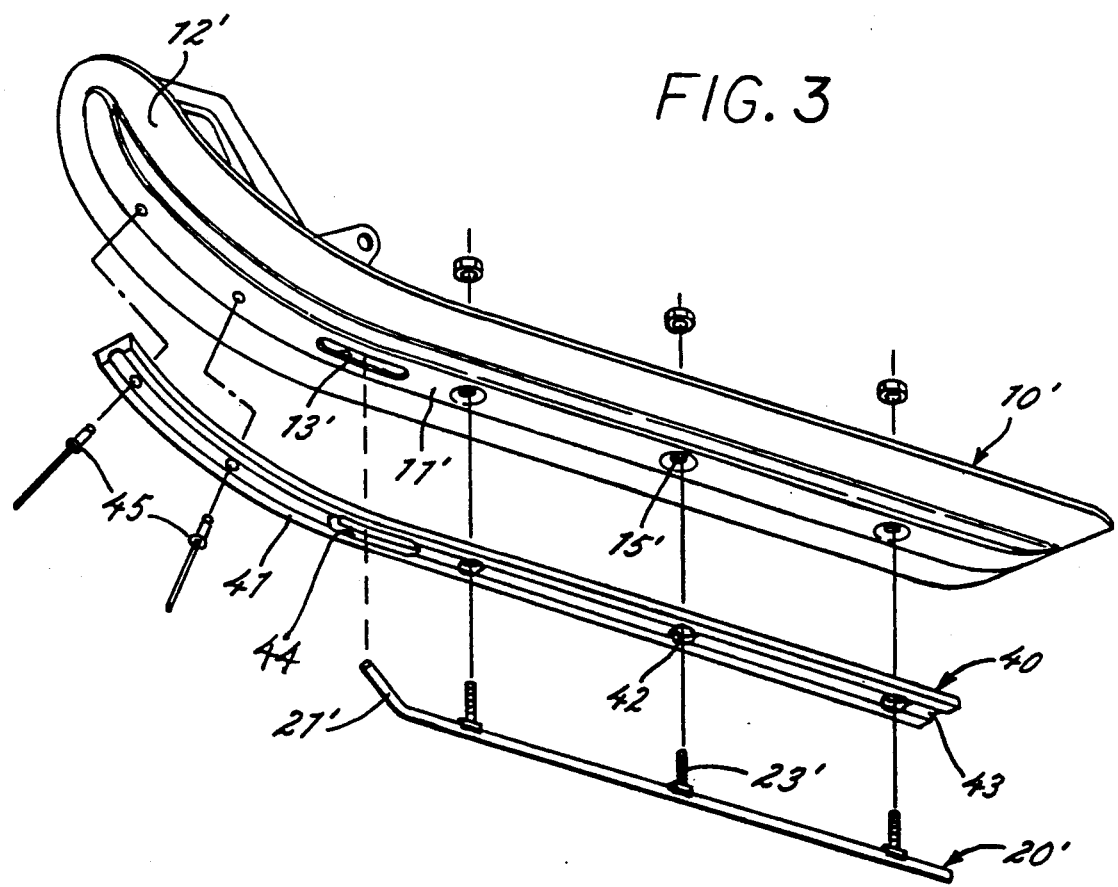
FIG. 3 is an exploded view of a snowmobile ski assembly comprising a ski which is equipped with a wear rod and a second preferred embodiment of the wear protectors of the subject invention.

As can be seen best in FIGS. 1 and 3, preferred embodiments of the wear protectors 30 and 40 of the subject invention preferably are used with a snowmobile ski 10 which is equipped with a wear rod 20. The ski 10 is of conventional design, and is fabricated, e.g., from cold pressed sheet steel. It is provided, as is common in conventional snowmobile skis, with a keel 11 which can be seen best in cross section in FIG. 2. The keel 11 extends nearly the entire length of the ski 10, tapering off on the front sweep 12 near the ski tip and on the rear end of the ski. In this illustrative snowmobile ski 10, the keel 11 is substantially squared off, with a groove which normally accommodates a wear rod, although rounded keels also are commonly used in snowmobile skis. In general, the novel wear protectors can be adapted for use with any of the wide variety of snowmobile skis commercially available.

Likewise, the wear rod 20 is of conventional design. Typically, wear rods are made of steel rods approximately ⅜ in diameter, and as is common, the wear rod 20 extends substantially the length of the keel 11, that is, at least that portion of the keel exposed during normal conditions to the ground. The wear rod 20 is provided with a front sweep 21 and a rear sweep 22. A bolt 23 is embedded in or otherwise secured to the rod 20. The sweeps 21 and 22 and the bolt 23 can be inserted through corresponding holes 13, 14, and 15 in the ski 10 and a nut threaded on the bolt 23 to secure the wear rod 20 to the ski 10.

In accordance with the subject invention, a first preferred embodiment of the subject invention comprises a strip 31. As best seen in FIG. 1, there is a hole 32 in the strip 31. That hole 32 is located on the strip 31 in alignment with the wear rod bolt 23. The strip 31 is installed between the wear rod 20 and the ski 10 with the wear rod bolt 23 passing through the hole 32. Thus, the wear protector 30 is held in place by the wear rod 20, and it may be installed or replaced when worn, quickly and easily, without using any rivets.

A groove 33, seen best in FIGS. 1 and 2, preferably is provided in the bottom surface of the strip 31. When the strip 31 is in place, the wear rod 20 is partially recessed into the strip 31. This helps to minimize any effect on the performance of the ski 10 which may be caused by, in effect, further removing the wear rod 20 from the bottom of the keel 11. It also enables the wear rod 20 to more closely engage the strip 31 and to hold the strip 31 more securely.

The strip 31 is relatively narrow, i.e., it is approximately as wide as is the bottom surface of the keel 11, the area of the ski bottom which supports most of the weight of the snowmobile and is most exposed to wear and tear when operated on snowy terrain. For example, snowmobile skis typically are from about 6½ to about 7" wide, and the keels are from about 1⅜ to about 2" wide. Thus, the strip 31 generally would be from about The strip 31 preferably covers substantially all of the bottom surface of the keel 11. Making the strip narrower tends to expose the keel. Making the strip wider, in theory, will provide protection to other portions of the bottom surface. Such areas, however, are not exposed to as much wear. Moreover, as the strip is made wider, the need to conform the strip to the contour of the ski increases, and this ultimately would require the expensive molding processes which are a disadvantage of the prior art ski skins.

The thickness of the strip 31 may be varied depending on a number of factors. Thicker strips, other factors being equal, are more sturdy and necessarily wear longer, while thinner strips tend to have less effect on the performance of the ski. The strip may be made thinner without sacrificing strength and wear resistance if it is fabricated from tougher, more durable materials.

Preferably, the strip 31 extends at least substantially the length of the exposed portion of the keel 11, that is, it extends substantially along that portion of the keel which is exposed during normal conditions to the ground. Accordingly, it is approximately the same length as the wear rod 20, except that it does not extend fully through the front sweep 21 or the rear sweep 22 of the wear rod 20. If the strip is shorter, portions of the keel can be exposed unnecessarily to wear and tear. If the strip is longer, the strip can interfere with installation of the wear rod.

When it is expected, however, that the skis will be exposed to extremely rough riding conditions, it is preferable that the strip extend further up the front sweep 12' of the ski 10' toward the ski tip, as shown in FIG. 3. Under such conditions, the front sweep 12' of the ski 10' is subject to abrasion. A longer strip 41, as exemplified in a second preferred embodiment shown in FIG. 3, provides such protection.

FIG. 3 also shows another common design for wear rods 20', wherein the wear rod 20' is secured by a plurality of bolts 23' and has a front sweep 21'. Accordingly, the strip 41 has an oval shaped hole 44 to accommodate the front sweep 21' of the wear rod 20'. This preferred wear protector 40 preferably has holes 42 and a groove 43 and otherwise is comparable to the wear protector 30 shown in FIGS. 1-2.

The forward end of the strip 41 preferably is secured to the front sweep 12' of the ski 10', e.g., by pop rivets 45. While this necessarily complicates the installation of the protector 40 to a certain degree, installation still is much simpler then prior art ski skins which may require numerous rivets.

The strip is composed of a wear resistant material. High density polymers, such as ultra high molecular weight (UHMW) polyethylene, are especially preferred. The UHMW polyethylene may be impregnated with graphite or carbon, and it may be cross-linked. Such polymers are extremely wear resistant, more so then steel. They also are somewhat flexible, which is particularly advantageous when a longer wear strip is desired. Somewhat less durable materials, such as steel or thermoplastic polymers, may be used, however, although there will be a corresponding decrease in the expected service life of the wear protector.

The wear protector may be fabricated by machining a sheet of such material with conventional equipment. No molding techniques are needed. While the flat material may not initially conform to a rounded keel, if plastic materials are used the strip will tend to conform. Because the strip is relatively narrow, it is believed that heat generated by friction with the wear rod will be transferred to the strip, momentarily softening it and allowing it to conform.

While this invention has been disclosed and discussed primarily in terms of specific embodiments thereof, it is not intended to be limited thereto. Other modifications and embodiments will be apparent to the worker in the art.

I claim:

1. An elongated snowmobile ski of predetermined width and having at least one hole extending vertically therethrough, an elongated wear rod underlying said ski and having a bolt sized to fit through said hole, and a wear protector sandwiched between said ski and said wear rod and having a hole aligned with the hole in said ski and receiving said bolt, a nut threaded on said bolt and clamping said wear rod and said wear protector to said ski, said wear protector comprising an elongated strip of wear resistant material having a width substantially less than the width of said ski, said strip having a bottom formed with an elongated groove for accommodating at least part of said wear rod, said groove having a width substantially less than the width of the bottom of said strip.

2. A ski as defined in claim 1 in which said wear resistant material is an ultra high molecular weight polyethylene material.

3. A ski as defined in claim 1 in which said ski includes a lower keel and a front sweep, said strip extending along substantially the entire length of said keel and extending along a portion of said front sweep.

* * * * *